Nov. 23, 1926. 1,608,391
H. H. HAND ET AL
COMBINED MIXER AND SLUDGE REMOVER FOR ACETYLENE GAS GENERATORS
Original Filed June 6, 1925   2 Sheets-Sheet 1

INVENTORS.
Howard H. Hand
AND
BY Josiah L. Riddle,

Geo. P. Kimmel ATTORNEY.

Nov. 23, 1926. 1,608,391
H. H. HAND ET AL
COMBINED MIXER AND SLUDGE REMOVER FOR ACETYLENE GAS GENERATORS
Original Filed June 6, 1925 2 Sheets-Sheet 2

INVENTORS.
Howard H. Hand
BY AND Josiah L. Riddle,
Geo. P. Kimmel. ATTORNEY.

Patented Nov. 23, 1926.

1,608,391

UNITED STATES PATENT OFFICE.

HOWARD H. HAND AND JOSIAH L. RIDDLE, OF MERKEL, TEXAS; SAID RIDDLE ASSIGNOR OF ONE PER CENT TO SAID HAND.

COMBINED MIXER AND SLUDGE REMOVER FOR ACETYLENE-GAS GENERATORS.

Original application filed June 6, 1925, Serial No. 35,347. Divided and this application filed October 27, 1925. Serial No. 65,161.

This invention relates to an acetylene gas generator, more particularly to a combined carbide mixer and sludge removing device, and this application is in part a division of our joint application filed June 6, 1925, Serial Number 35,347, and the invention forming the subject matter of this application has for its object to prevent caking and stacking up of the calcium carbide or the residuum or sludge derived therefrom within the generating chamber to prevent a sudden rise in pressure which is caused by the water breaking through the caked or unslacked sludge, as the preventing of such sudden rise in pressure reduces the possibility of explosion to a minimum.

A further object of the invention is to provide, in a manner as hereinafter set forth, a revoluble, perforated mixing blade operating on and throughout the bottom of the generator as the carbide is supplied thereto, and with said blade further operative in a like manner to facilitate drainage of the generating chamber, as well as to facilitate the removal of the sludge when the carbide feed is shut off.

Further objects of the invention are to provide, in a manner as hereinafter set forth, a combined mixer and sludge removing device for use in connection with acetylene gas generators and which is simple in its construction and arrangement, strong, durable, compact, thoroughly efficient in its use, inexpensive to manufacture, and readily installed with respect to the generator.

With the foregoing and other objects in view, the invention consists of the novel construction, combination and arrangement of parts, as hereinafter more specifically described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
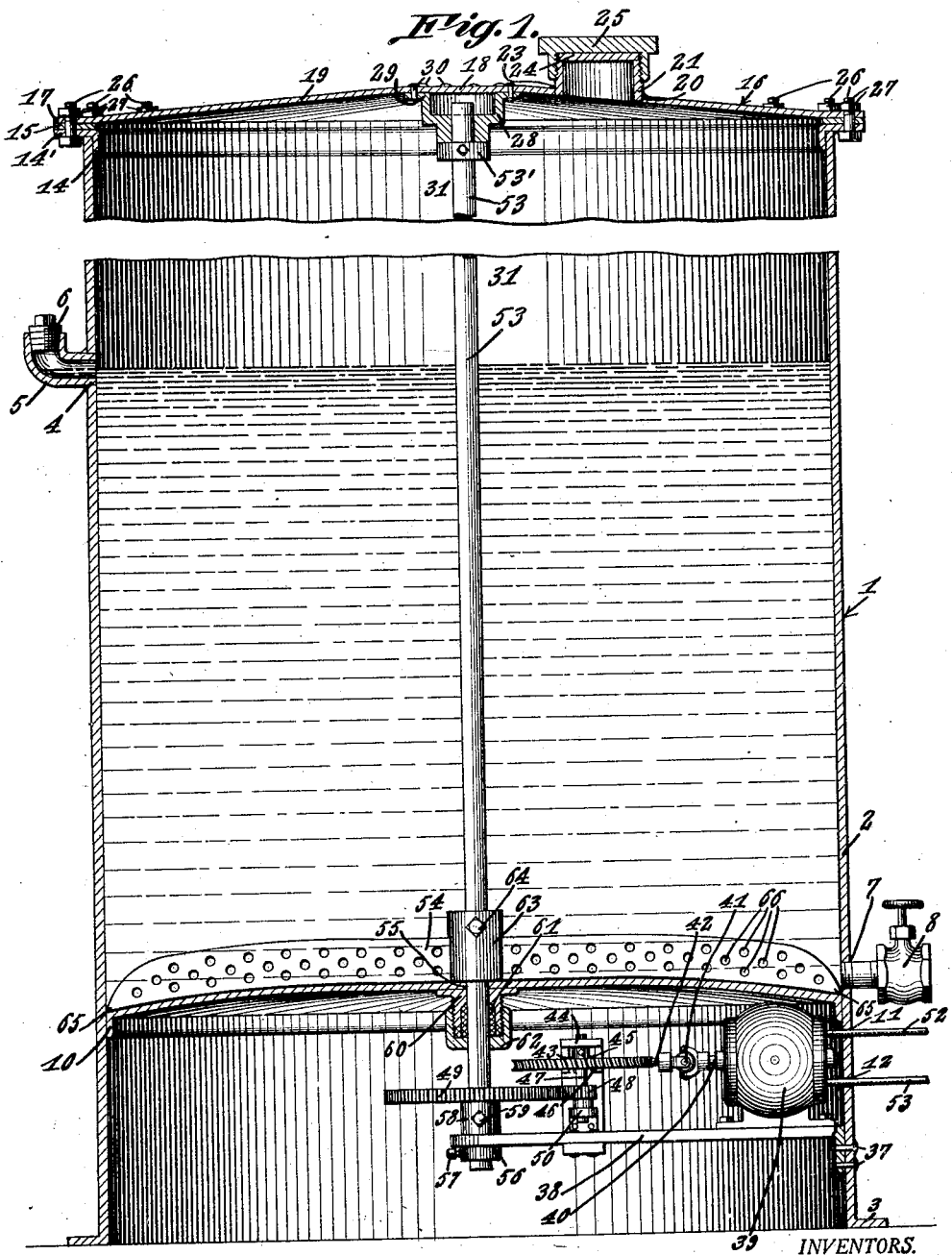
Figure 1 is a fragmentary view in vertical section, of an acetylene gas generator, showing the adaptation thereof of a combined mixer and sludge removing device in accordance with this invention.

Referring to Figure 1 of the drawings, 1 generally indicates an acetylene gas generator and which comprises a receptacle in the form of a tank consisting of a cylindrical body portion 2 of substantial diameter and having the lower end thereof formed with a laterally extending flange or foot piece 3. The body portion is formed, intermediate its ends, with an opening 4 in which is connected a laterally extending tubular member 5, forming a water inlet and which is normally closed by a plug 6, threadedly engaging therewith. The body portion 2 is further provided with an opening 7 in proximity to its lower end and in which is secured a valved drainage connection 8. Secured within the body portion 2, a substantial distance above the lower end thereof and in proximity to the opening 7, is a dome-shaped bottom 9 formed with a depending annular flange 10, which is secured to the inner face of the body portion 2. The bottom 9 is positioned below, but in close proximity to the opening 7, and further positioned above spaced openings 11 and 12. The bottom 9, in connection with that part of the body portion 2 which depends from said bottom 9, provides a chamber 13 for a purpose to be presently referred to. Fixedly secured to the inner face of the body portion 2, at the top thereof, is a narrow, annular collar 14, having projecting from its upper end a laterally extending annular flange 14' which seats on and projects outwardly from the top edge of the body portion 2.

Positioned on the flange 14' and of the same width as said flange, is a flat annular gasket 15. Mounted on the gasket 15 is a closure plate referred to generally by the reference character 16, formed with a flat perimeter 17, a flat central portion 18 and an inclined intermediate portion 19, which extends upwardly from the perimeter 17 to the central portion 18. The intermediate portion 19 is formed with an opening 20 in which is positioned a short filling tube 21 provided with peripheral threads. The tube 21 is secured to the plate 16, as at 23, and mounted on the upper end of the tube 21 is a packing disk 24. The tube 21 is closed through the medium of an interiorly threaded flanged cap 25, which bears against the disk 24. The plate 16 is detachably secured to the flange 14 and gasket 15 by a series of bolts 26, which extend upwardly through said flange 14, gasket 15 and the perimeter 17 of the plate 16 and carry on their upper ends securing nuts 27. The heads of the bolts 26 abut against the lower face of the flange 14. The tube 21 is employed for supplying carbide to a carbide receiver, not shown, and which is adapted to be arranged within the generating chamber 31. It is thought unnecessary to illustrate the carbide receiver as it can be of the form as shown in our application aforesaid, and further because it forms no part of the invention forming the subject matter of this application.

The elements as referred to are illustrated by way of example for the purpose of showing the adaptation with the generating chamber 31 of a combined mixer and sludge removing device, in accordance with this invention.

Figure 2:
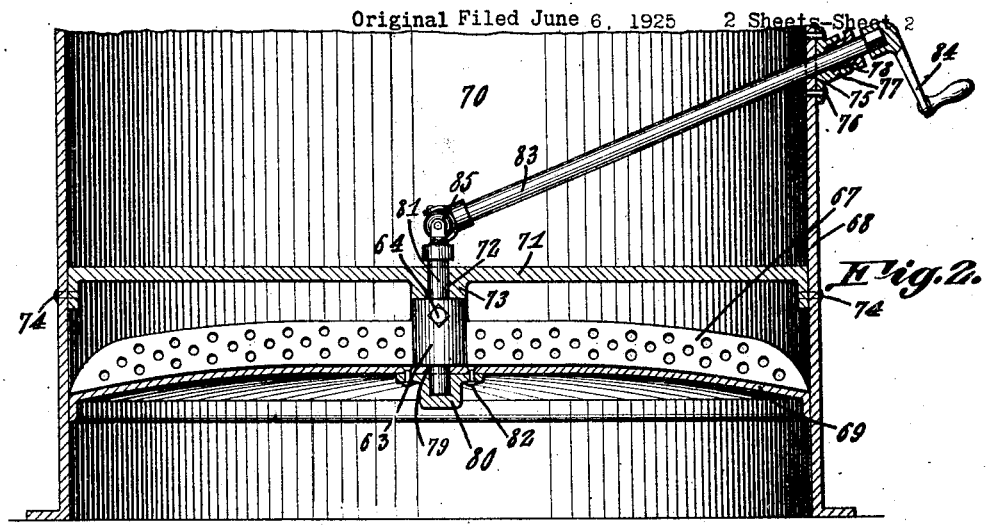
Figure 2 is a like view of a modified form.
Figure 3:
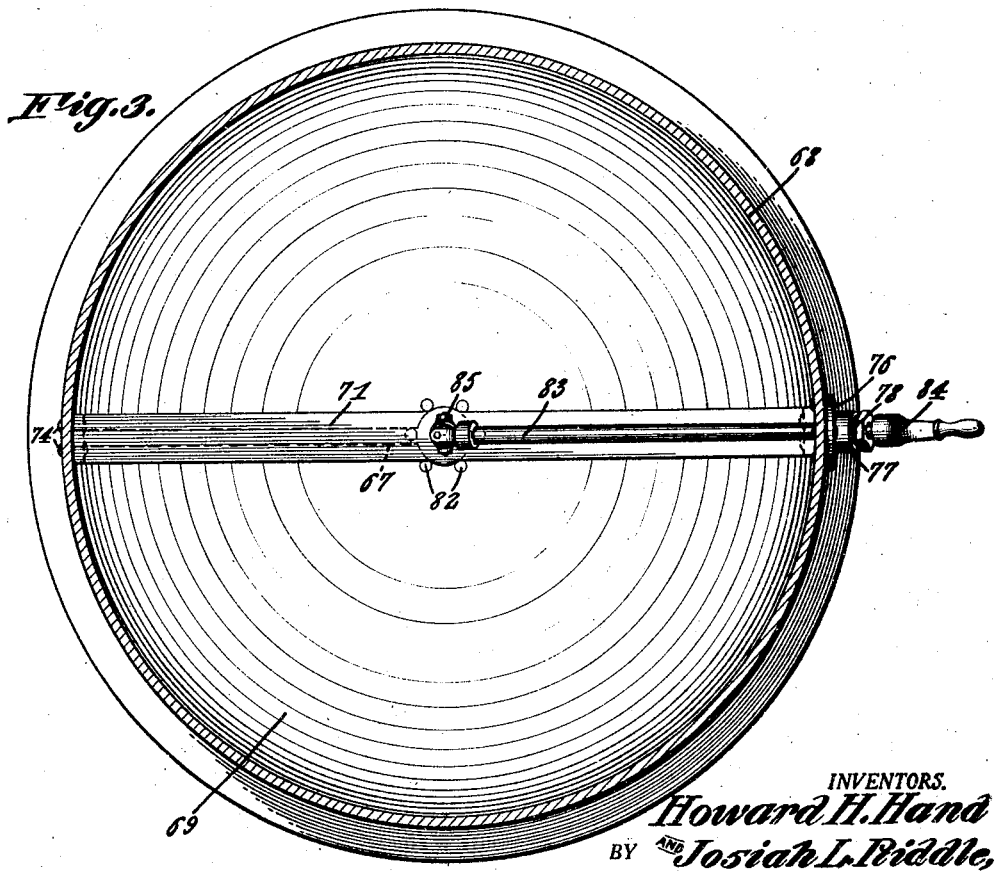
Figure 3 is a top plan view of the form shown in Figure 2.

With reference to the form of combined mixer and sludge removing device illustrated in Figure 1, it is of the electrically driven type, whereas the form shown in Figures 2 and 3 is manually operated.

Further with reference to Figure 1, there is positioned against the lower face of the flattened central portion 18 of the plate 16, as well as depending a substantial distance therefrom, a tubular bearing element 28 provided at its top with a laterally extending flange 29 fixedly secured by the hold-fast devices 30 to said flattened portion 18.

Arranged within the chamber 12 and secured against the inner face of the body portion 2, by the hold-fast devices 37, is a platform 38 upon which is mounted an electric motor 39, having its shaft 40 extended therefrom and universally connected, as at 41, to a shaft 42, provided with a worm not shown, which engages with the worm gear 46. Secured to the platform 38 is a vertically disposed yoke-shaped support 44 which projects from one side of and overlaps the platform 38 and is formed with a bearing 45 for the shaft 42. The worm gear 46 is carried by a vertically disposed shaft 47, having fixed thereto a pinion 48 which meshes with a large gear wheel 49. The shaft 47, at its upper end, is journalled in the top of the support 44 and at its lower end in a bearing 50 mounted on the platform 38. The circuit wire connections for the motor 39 are indicated at 51, 52, and extend respectively through the openings 11 and 12. The ratio of the gear 49 with respect to the pinion 48 is 12 to 1, and the ratio of the gear 46 with respect to the worm which meshes therewith is 96 to 1, although these ratios can be changed if desired.

The motor and the operative drive connection between the motor shaft and the gear 49, as well as the latter, provide an operating mechanism for revolving the combined mixer and sludge removing device of that form as illustrated in Figure 1.

Further with respect to Figure 1, the combined mixer and sludge removing device comprises a vertically disposed operating shaft 53 for a mixer and sludge removing blade 54 formed from a one piece curved bar of appropriate thickness and width and further standing on edge. The blade 54 operates on the upper face of the bottom 9 and is the same length as the inner diameter of the body portion 2. The upper end of the shaft 53 extends into the bearing element 28 and carries an adjustable stop collar 53' which bears against the lower end of the element 28. The shaft 53 extends entirely through the generating chamber 51 and also through an opening 55 formed in the bottom 9. The shaft 53 is of a length to extend through and depend from the inner end of the platform 38. Carried on the lower end of the shaft 53 is a stop collar 56 provided with a set screw 57. The shaft 53 has mounted thereon the gear wheel 49 and the latter is formed with a hub 58 provided with a set screw 59. The hub 58 seats on the upper face of the platform 38, and the collar 56 abuts against the lower face of said platform. Secured against the lower face of the bottom 9, as well as depending therefrom, is a bearing member 60 through which extends the shaft 53. The bearing member 60 carries a packing 61 which surrounds the shaft 53 and is secured in position by a cap 62, having threaded engagement with the member 60. The shaft 53 extends through the cap 62.

The lower face of the blade 54 conforms in contour to the shape of the bottom 9, and said blade 54, centrally thereof, is formed with a vertically disposed hollow, integral, circular enlargement which provides a sleeve 63 through which extends the shaft 53, and said sleeve 63 is provided with a set screw 64 for fixedly securing it to the shaft 53. The blade 54 is of substantial thickness and height but the height of the blade is less than the height of the sleeve 63. As illustrated, the bottom edge of the blade 54 throughout is of arcuate contour. Each end of the blade is curved to provide a point 65, which travels at the point of joinder between the bottom 9 and inner face of the body portion 2. The blade 54 is perforated throughout from the sleeve 63 to each end and the perforations in the blade are indicated at 66.

When the blade is operated it prevents carbide or the residuum or sludge derived therefrom from caking or stacking on the upper face of the bottom 9, and as the blade is perforated, the water and suspended fine particles of carbide or residuum can pass through the blade during the revolving thereof, and owing to the blade being perforated its operating is freer than would be the case if the blade were not perforated. The blade furthermore operates to facilitate the drainage of the generating chamber when the carbide feed is shut off, and also facilitates the removal of the sludge through drainage connection 8.

The form of the device illustrated in Figures 2 and 3 is of the manually driven type and the blade, which is referred to generally by the reference character 67, is of the same construction as that referred to in connection with blade 54, and, therefore, it is thought unnecessary to specifically describe the blade 67. The body portion of the tank is indicated at 68, dome-shaped bottom at 69 and the generating chamber formed by the tank at 70. Secured within the body portion 68, at the lower part of the chamber 60 and spaced a substantial distance above the bottom 69 is a yoke-shaped bar 71, extending diametrically from the bottom portion 68 and formed with a centrally disposed opening 72 and a collar 73 on its lower face and with the opening formed by the collar forming a continuation of the opening 72. The bar 71 is secured to the body portion 68 by the hold-fast devices 74. The body portion 68, above the bar 71, is formed with an inclined opening 75, and connected to the outer face of the body portion 68 by the hold-fast devices 76 and registering with the opening 75 is an inclined bearing element 77 provided with a packing 78.

The bottom 69, centrally thereof, is formed with an opening 79 which aligns with the opening 72, and secured to the lower face of the bottom 69 as well as depending therefrom is a socket forming member 80 which provides a bearing for the lower end of the operating shaft 81 for the blade 67. The member 80 is secured to the bottom 69 by the hold-fast devices 82. The shaft 81 projects slightly above the bar 71 and disposed at an inclination with respect to the shaft 71 is a manually operated driving element 83 therefor. The element 83 extends through the opening 75 and bearing 77 and projects outwardly from the latter and carries on its upper end a handle member 84 therefor. The inner end of the driving element 83 is connected to the upper end of the shaft 81 by a universal joint 85. The sleeve 63 of the blade 67 is mounted on the shaft 81 and interposed between the collar 73 and the upper face of the bottom 69. The sleeve 63 is connected to the shaft 81 by a set screw 64. The blade 67 operates in the same manner as the blade 54. The only difference is that the blade 67 is manually driven, whereas the blade 54 is operated through an electrically actuated driving mechanism therefor.

It is thought the many advantages of a combined carbide mixer and sludge removing device, in accordance with this invention, can be readily understood, and although the preferred embodiments of the invention are as illustrated and described, yet it is to be understood that changes in the details of construction can be had which will fall within the scope of the invention as claimed.

What I claim is:—

1. A combined mixer and sludge removing device for acetylene gas generating chambers comprising a revoluble mixer blade having its lower edge extending in the same plane throughout and each of its ends pointed, said blade formed from a one piece bar having the top and bottom edges of arcuate curvature and extending lengthwise thereof, said bar of appropriate height, standing on its bottom edge and provided centrally thereof with an integral vertically disposed hollow enlargement for the reception of the driving means for the blade, said enlargement formed with a lateral opening for the passage of a hold-fast device to removably secure the blade to its driving means, and said blade formed with sets of superposed rows of perforations, each set extending from said enlargement to an end of the bar.

2. A combined mixer and sludge removing device for acetylene gas generating chambers comprising a revoluble mixer blade having its lower edge extending in the same plane throughout and each of its ends pointed, said blade formed from a one piece bar having the top and bottom edges of arcuate curvature and extending lengthwise thereof, said bar of appropriate height, standing on its bottom edge and provided centrally thereof with an integral vertically disposed hollow enlargement for the reception of the driving means for the blade, said enlargement formed with a lateral opening for the passage of a hold-fast device to removably secure the blade to its driving means, said blade formed with sets of superposed rows of perforations, each set extending from said enlargement to an end of the bar, the perforations of one row of a set staggered with respect to the perforations of adjacent rows of the set.

In testimony whereof, we affix our signatures hereto.

HOWARD H. HAND.
JOSIAH L. RIDDLE.